US008007866B2

(12) United States Patent
Greenberg

(10) Patent No.: US 8,007,866 B2

(45) Date of Patent: Aug. 30, 2011

(54) SIMULATED PATINA FOR COPPER

(75) Inventor: Percy Greenberg, Minnetonka, MN (US)

(73) Assignee: BFS Diversified Products Company, LLC, Indianapolis, IN (US)

( * ) Notice: Subject to any disclaimer, the term of this patent is extended or adjusted under 35 U.S.C. 154(b) by 153 days.

(21) Appl. No.: 12/324,389

(22) Filed: Nov. 26, 2008

(65) Prior Publication Data

US 2009/0297792 A1 Dec. 3, 2009

Related U.S. Application Data

(63) Continuation of application No. 11/389,981, filed on Mar. 27, 2006, now abandoned, which is a continuation of application No. 10/691,422, filed on Oct. 22, 2003, now Pat. No. 7,018,677, which is a continuation-in-part of application No. 10/621,704, filed on Jul. 17, 2003, now Pat. No. 7,060,325.

(51) Int. Cl.
*B05D 5/06* (2006.01)
*B05D 1/02* (2006.01)
*B32B 3/00* (2006.01)

(52) U.S. Cl. ...................... 427/280; 427/287; 428/195.1

(58) Field of Classification Search .................. 427/280, 427/287; 428/195.1

See application file for complete search history.

(56) References Cited

U.S. PATENT DOCUMENTS

| | | | | |
|---|---|---|---|---|
| 1,985,236 | A | 12/1934 | Blatz | |
| 2,113,449 | A * | 4/1938 | Hoffman et al. | 427/280 |
| 4,220,679 | A | 9/1980 | Backhouse | |
| 4,416,940 | A | 11/1983 | Loye et al. | |
| 4,837,056 | A | 6/1989 | Easley | |
| 5,340,610 | A | 8/1994 | Thompson | |
| 6,176,905 | B1 * | 1/2001 | Priggemeyer et al. | 106/1.18 |
| 7,018,677 | B2 * | 3/2006 | Greenberg | 427/262 |
| 7,060,325 | B2 * | 6/2006 | Greenberg | 427/280 |
| 2005/0011750 | A1 | 1/2005 | Greenberg | |
| 2005/0011751 | A1 | 1/2005 | Greenberg | |

FOREIGN PATENT DOCUMENTS

| | | | |
|---|---|---|---|
| JP | 2002 180264 | * | 6/2002 |
| JP | 2002180264 | A | 6/2002 |

* cited by examiner

*Primary Examiner* — Frederick J Parker

(74) *Attorney, Agent, or Firm* — Jason A. Houser; Arthur M. Reginelli

(57) ABSTRACT

A process for imparting a simulated patina appearance to a copper substrate including selecting a colorant having the desired initial patina color tone and producing a noncontinuous layer of the colorant on a surface of the copper substrate to provide the appearance of patination of the desired tone via interspersed spots of the colorant. The remaining portion of the substrate is exposed for natural patination.

18 Claims, 2 Drawing Sheets

SIMULATED PATINA FOR COPPER

This Application is a Continuation Application of Ser. No. 11/389,981 now ABN, filed on Mar. 27, 2006, which is a Continuation of Ser. No. 10/691,422, now U.S. Pat. No. 7,018,677, filed on Oct. 22, 2003, which is a Continuation-in-Part of Ser. No. 10/621,704, now U.S. Pat. No. 7,060,325, filed on Jul. 17, 2003, all of which are incorporated herein by reference.

BACKGROUND OF THE INVENTION

The present invention relates to copper architectural elements and, more particularly, to a simulated patina for such elements.

Patination of copper is a well known process and is desired in many architectural contexts for its unique, blue-green appearance. However, natural patination is very slow, taking as long as 20 years, or more. Thus, while the end result, and even intermediate stages, are considered desirable, the length of the patination process, and the variation in colors during that process, delay the visual effects and complicates any necessary repairs. Indeed, in many instances, the patination of existing copper architectural elements renders their repair aesthetically impractical.

An obvious prior art attempt to mimic patination is the utilization of a uniform coating of paint of a desired tone (color). While this allows the use of cheaper substrates, its effect is not aesthetically pleasing in that paint lacks the unique character and appearance of patinated copper.

A variation of the approach described above is disclosed in U.S. Pat. No. 4,416,940 which discloses a two step process to impart a simulated weathered-copper appearance to a substrate. The first step applies an opaque patina colored base coating to a primed or unprimed substrate. After the base coat is cured, a non-opaque top coat is applied. This second coating contains one or more copper-color-producing additives and has transparencies such that the patina color of the base coat may be perceived through the top coat while the top coat reflects light from its additives to provide a copper color. While this process may better mimic the appearance of patination, it is nonetheless a non-changing coating that does not (on application, or over time) satisfactorily simulate the unique character and aesthetic appeal of patinated copper.

A further attempt to avoid the long patination process is the product available under the trademark EVERGREEN from Revere Copper Products, Inc. This product provides a pre-patinated copper substrate that patinates further following installation. Uniformity in appearance is not available at installation. Further, dependent on the conditions in the region of installation, "maturity" may or may not provide a uniformity of appearance over time. Additionally, and most important, such pre-patinated panels have been known to be harmful to the forming equipment employed in the fabrication of a final panel configuration. That is, pre-patinated materials are typically available in sheets to be bent and/or cut in the desired configuration for installation. The equipment on which these forming operations take place are attacked by the residual materials employed in the pre-patination process such that they require significant additional maintenance and part replacement. This is not only detrimental to the forming equipment but also significantly increases the cost of using the pre-patinated products.

DETAILED DESCRIPTION OF THE DRAWINGS

The present invention imparts a simulated patina appearance to a copper substrate by the application of a colorant having a desired initial patina color to a copper substrate. The colorant is applied as a non-continuous layer to provide the appearance of patination of the desired tone by interspersed spots of the colorant. The remaining (non-covered) portion of the substrate remains exposed for natural patination. In a preferred embodiment, the tone of the colorant duplicates or replicates the look of 5+ years of natural patina development. However, for the purposes of this specification and claims, the term "patina" is intended to embrace not only the blue-green color commonly intended by that term but other naturally developing colors as well. As described, the uncovered portion of the substrate is allowed to "age" naturally such that a natural patina is developed, over time.

The colorant may be any paint-like material having the desired tone(color) with paint having the necessary and desired characteristics. Other suitable materials or paints may include acrylics, Kynar, polyester, urethane, or other coatings as commonly used in the coating of architectural panels, all being referred to herein collectively "paint."

Figure 1:
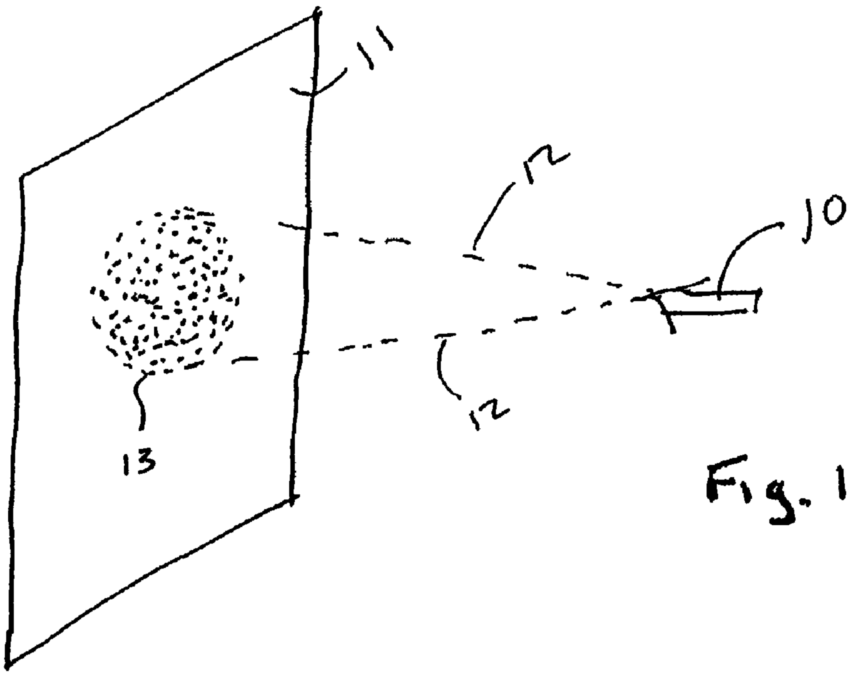
FIG. 1 is diagrammatic illustration of a spattering process employed in the practice of the present invention; and, FIG. 2 illustrates a substrate having a surface processed in accordance with the present invention and a copper sheet produced by that process.

Copper substrates processed in accordance with the present invention may be in either sheet or rolls for forming and are prepared in any manner known to the industry as suitable for a paint coating. In a preferred embodiment, the colorant is spattered on the substrate by a spray gun as represented in FIG. 1. In FIG. 1, the spray gun is represented at 10 and the substrate at 11. The outlines of the spray pattern are shown at 12 with the intended pattern of colorant on the substrate being shown within the circle 13 on the substrate 11 as a series of dots or spots. In accordance with the present invention, the colorant is applied in a noncontinuous layer such that a portion of the substrate remains exposed for natural patination. This is accomplished through the application of colorant in a manner similar to that resulting from overspray in a typical paint coating application. That is, the colorant is applied as discreet dots on the surface of the substrate 11, which colorant layer of dots or spots is referred to herein as non-continuous. The colorant is not applied as a coating. Such "spatter" painting is known to the prior art and, does not form a film.

As described above, the application of colorant as discreet dots or spots allows the uncovered substrate to mature (patinate) naturally. It also provides a desired tone or hue to the substrate while allowing the underlying substrate copper color to show through. The relative percentage of open area to covered area will determine the amount of natural patina that will develop.

The development of a natural patina is a desired result of the present invention. That is, as the colorant ages, a natural patina will develop on the surrounding exposed substrate surface. Thus, the copper substrate develops its own aesthetically pleasing patina while taking advantage of the enhanced, aged appearance provided by the colorant during the initial years.

Figure 2:
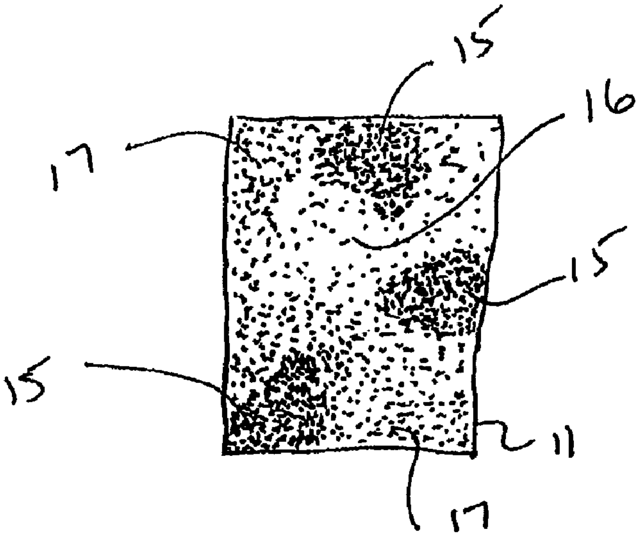

The use of a spray gun to provide a spattering of colorant on the substrate surface is within the skill of one ordinarily skilled in the art. To further the replication of natural patina, it is within the scope of the present invention to non-uniformly spatter the colorant on the substrate surface. This is illustrated in FIG. 2 wherein the member 11 represents a substrate having its surface spattered as described above in a manner which produces areas of denser spattering 17, reduced spattering 16 and moderate spattering 17. This randomness or non-uniformity is accomplished by varying the volume of paint from one area to another (as by varying the input to the spray gun) or by varying the relative movement of the gun and the substrate, or both. These spatter density variations enhance the simulation of natural patina.

In some instances, it may be desirable to mechanically act on the surface of the substrate 11, as by a wire brush, to either ensure that the spattered colorant leaves areas of the substrate surface uncovered, to vary the coverage of the spattered colorant, or both. Indeed, it within the contemplation of the present invention that colorant may be non-continuously produced on the substrate surface by mechanical removal of colorant from that surface to provide and/or assure that portions of the substrate surface remain exposed. However, it is presently contemplated that the best mode of performing the present invention is through the process of spattering the paint/colorant as described, without the need for further mechanical operations. The spattered colorant is cured in known manner.

As described to this point, a non-continuous layer of colorant has been produced by painting or mechanical techniques. A further alternative employs printing techniques such as screen printing wherein the screen establishes the desired pattern of colorant on the substrates in a known manner. The characteristics of the ink employed as a colorant are known to the art.

A screen printing process will allow the production of dots of varying color/tone across the surface of the substrate to create a non-continuous layer of such dots. This layer is also non-uniform as to the position of the dots as well as their color, such that color and/or color intensity vary across the substrate surface, all in a known manner. To this end, one or more screens having the desired pattern are created. Such a screen may have the appearance of the member 11 of FIG. 2 which may also represent a screen with the "dots" of fields 15-17 representing the screen pattern for a desired color of ink/colorant.

A still further alternative employs known roll coating techniques. Typically, roll coaters include an applicator roll having a deformable elastic cover (of polyurethane or hard synthetic rubber, for example) and a relatively hard metering roll. The metering roll picks up coating from a reservoir and presses against the deformable cover of the applicator roll to control the thickness of the film coating on the applicator roll and, thus, the thickness of the coating transferred to the moving metal web. A support or back up roll supports the opposite side of the web. More complex mechanisms are known, the use of an intermediate roll between the applicator roll and the metering roll, for example. All such known roll coaters may be employed in the practice of the present invention with the only required modification being to the applicator roll.

Figure 3:
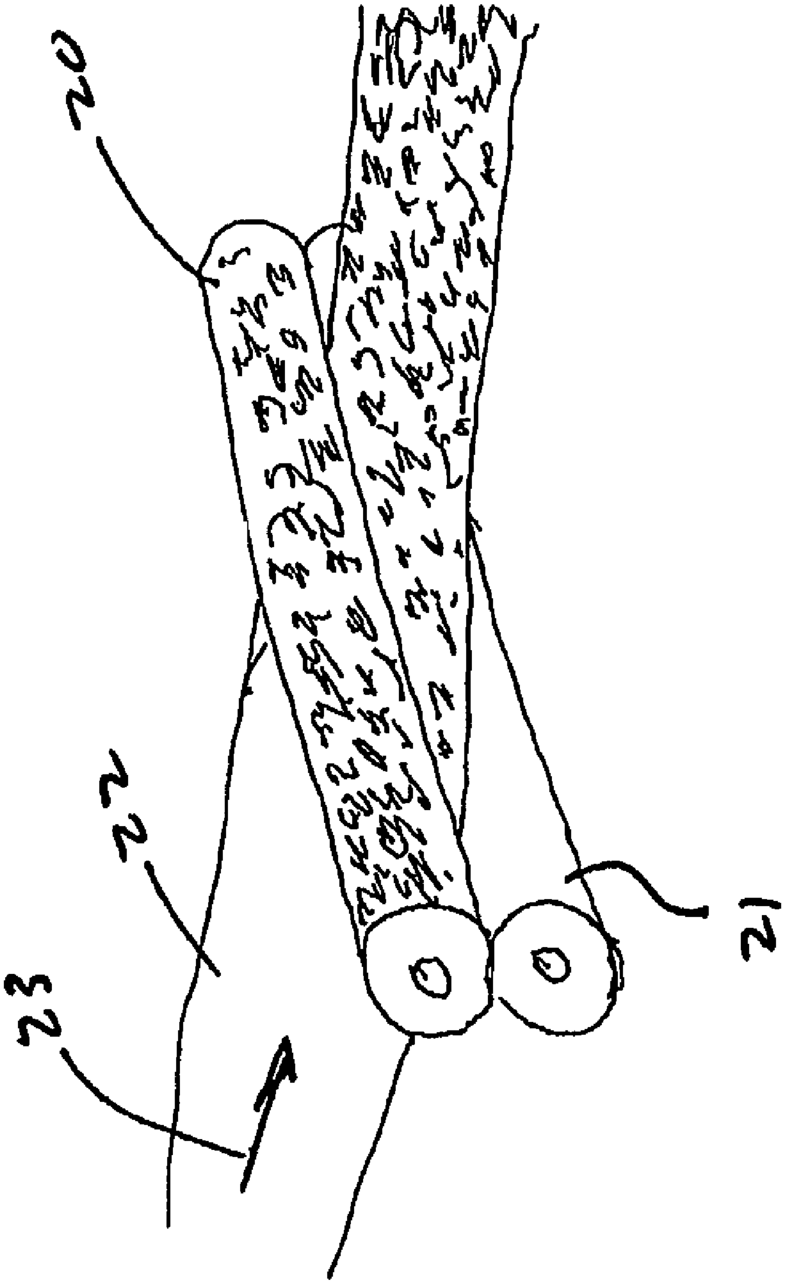
FIG. 3 illustrates the modifications to a roll coater in accordance with the present invention.

FIG. 3 illustrates the modifications to a roll coater in accordance with the present invention, the applicator roll 20 and support roll 21 being illustrated in FIG. 3. As is well known in the art, a web of material 22 passes between the rollers 20 and 21 in the direction of the arrow 23. Through the action of a metering roll (not shown) a coating (paint in the present invention) is transferred to the applicator roll 20 and applied to the web 22 as it passes between the rolls 20 and 21, in known manner. In accordance with the present invention, the elastic cover of the applicator roll 20 has an interrupted surface such that a non-continuous layer of colorant is applied to the surface of the web 22. In this way, the colorant is spattered on the web surface in the desired pattern.

The discontinuities in the surface of the applicator roll 20 may be produced by removing portions of the surface of the roll 20 in any convenient way. Additionally, the surface of the roll 20 may be provided with a pattern such that a pixel-like pattern is produced on the web 22, in known manner. In this instance, a "spatter" of colorant on the surface of the web 22 has within it open areas which may patinate together with the areas between spatters.

Any of the above techniques may be employed to produce a transfer or decal. That is, spraying, printing (screen printing or otherwise) or roll coating may be employed to produced a non-continuous layer of colorant on a web with that colorant layer then being transferred or applied to a copper substrate to provide the appearance of patination. The remaining portion of the substrate remains exposed for natural patination, as desired.

In any of the described embodiments, multiple colors may be employed to enhance the simulation of patination of the substrate. With one or multiple colors, the desired non-continuous spattering of dots in a layer is accomplished.

Obviously, many modifications and variations of the present invention are possible in light of the above teachings. For example, the invention may be practiced with or without the mechanical removal of colorant from the copper substrate, or solely by mechanical removal of colorant from the substrate surface, to provide the desired result of a non-continuous layer of colorant on the copper substrate surface. In any case, the simulation of patination of the desired tone via interspersed spots of colorant with the remaining portion of the substrate being exposed for natural patination is the intended result. This may be created on copper substrates in sheet or roll form for later processing in any desired configuration using existing forming equipment. It is therefore to be understood that, within the scope of the appended claims, that invention may be practiced otherwise than is specifically described.

The invention claimed is:

1. A process for imparting a simulated patina appearance to a copper substrate comprising the steps of:

selecting a paint having a desired initial patina color tone; and applying said paint to a copper substrate surface to produce a noncontinuous layer of said paint of the desired initial patina color tone on a surface of the copper substrate, said noncontinuous layer of paint providing the appearance of patination of the desired tone via interspersed spots of said paint, and providing an exposed portion of the surface of the copper substrate for natural patination.

2. The process of claim 1 wherein the step of applying comprises the step of spattering said paint on said copper substrate surface.

3. The process of claim 2 wherein said spattering step is performed to produce non-uniform spattering of said paint on said copper substrate surface.

4. The process of claim 3 wherein said applying step further comprises the step of mechanically removing paint from said copper substrate surface using a wire brush.

5. The process of claim 4 wherein said mechanically removing step is performed to produce a non-uniform distribution of paint spots on said copper substrate surface.

6. The process of claim 1 wherein said step of applying comprises painting a paint on said copper substrate surface.

7. The process of claim 1 wherein said step of applying comprises printing a paint on said copper substrate surface.

8. The process of claim 1 wherein said step of applying comprises roll coating a paint on said copper substrate surface.

9. The process of claim 1 wherein said step of applying includes:

mechanically and non-uniformly removing paint from said copper substrate surface using a brush.

10. A substrate colored according to the process of claim 1.

11. The process of claim 1 wherein said applying step comprises the step of spraying said paint on said copper substrate surface.

12. The process of claim 1 wherein the step of applying comprises the step of non-uniformly spraying said paint on said copper substrate surface.

13. The process of claim 12 wherein the step of non-uniformly spraying comprises the step of varying the density of paint applied to said substrate.

14. The process of claim 12 wherein the step of non-uniformly spraying comprises the step of varying the relative movement of said substrate and paint spray.

15. The process of claim 12 wherein the step of non-uniformly spraying comprises the step of varying the volume of paint sprayed.

16. The process of claim 1, wherein the paint selected and applied to the copper substrate includes an acrylic material.

17. The process of claim 1, wherein the paint selected and applied to the copper substrate includes a polyester material.

18. The process of claim 1, wherein the paint selected and applied to the copper substrate includes a urethane material.

* * * * *